(12) United States Patent
Kohno et al.

(10) Patent No.: US 7,433,699 B2
(45) Date of Patent: Oct. 7, 2008

(54) INFORMATION PROCESSING SYSTEM AND INFORMATION PROCESSING METHOD

(75) Inventors: Michimune Kohno, Tokyo (JP); Junichi Rekimoto, Kanagawa (JP)

(73) Assignee: Sony Corporation, Tokyo (JP)

(*) Notice: Subject to any disclaimer, the term of this patent is extended or adjusted under 35 U.S.C. 154(b) by 794 days.

(21) Appl. No.: 10/795,317

(22) Filed: Mar. 9, 2004

(65) Prior Publication Data

US 2004/0235504 A1 Nov. 25, 2004

(30) Foreign Application Priority Data

Mar. 13, 2003 (JP) ............................. 2003-068581

(51) Int. Cl.
*H04Q 7/20* (2006.01)
(52) U.S. Cl. ..................... 455/466; 455/403; 455/419
(58) Field of Classification Search ............... 455/466, 455/463, 419, 403; 709/200, 202, 206, 217, 709/239, 245; 370/352, 310, 395.52
See application file for complete search history.

(56) References Cited

U.S. PATENT DOCUMENTS 6,349,324 B1 * 2/2002 Tokoro ....................... 709/200
6,359,880 B1 * 3/2002 Curry et al. ................. 370/352
6,957,040 B1 * 10/2005 Tanaka ...................... 455/3.06

FOREIGN PATENT DOCUMENTS

JP 2000-115253 4/2000

\* cited by examiner

*Primary Examiner*—Melur Ramakrishnaiah
(74) *Attorney, Agent, or Firm*—Oblon, Spivak, McClelland, Maier & Neustadt, P.C.

(57) ABSTRACT

There is provided an information processing system, which includes measures to address issues regarding the access control and/or session control, capable of transmitting and receiving a control packet from a remote apparatus that is placed on a network in a location where another party resides, with which voice dialog communications is being taken place. Further it is desirable to provide an information processing system and/or an information processing method with. Two personal digital assistants are respectively connected via radio to two connection points, which are called access points, to perform voice communication using VoIP network. In addition, the two personal digital assistants exchange packets of data between two personal computers via the Internet and local radio communication units after establishments of connections with the personal computers are achieved using RFID.

4 Claims, 10 Drawing Sheets

RPOCESS FROM PDA-TO-PDA CONNECTION
TO PC-TO-PC DATA TRANSFER VIA PDA

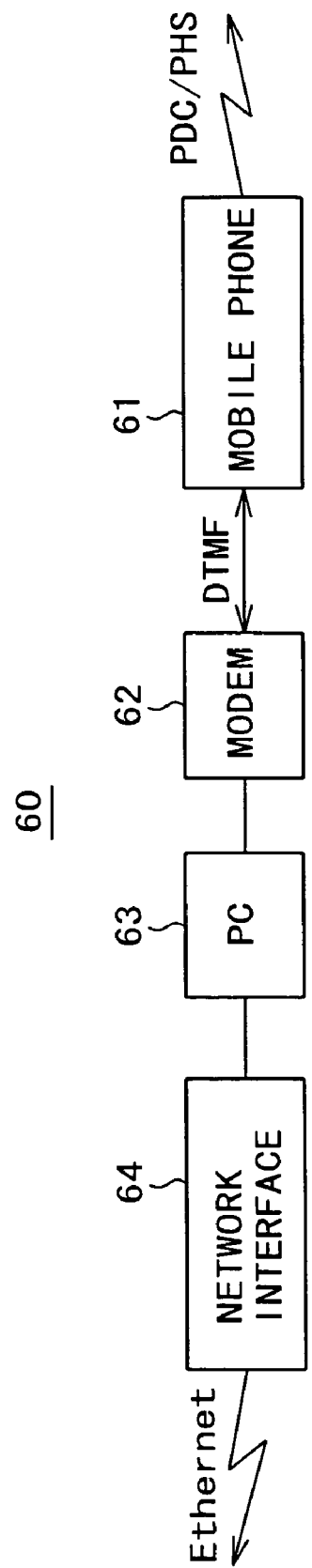

INFORMATION PROCESSING SYSTEM AND INFORMATION PROCESSING METHOD

CROSS REFERENCES TO RELATED APPLICATIONS

The present invention claims priority to its priority document No. 2003-068581 filed in the Japanese Patent Office on Mar. 13, 2003, the entire contents of which being incorporated by reference herein.

BACKGROUND OF THE INVENTION

1. Field of the Invention

The present invention relates to an information processing system, which includes at least two mobile electronic apparatuses and two information processing apparatuses respectively connected to a communications network such as Internet and telephone lines, for voice dialog communication together with other data communication, and also to an information processing method thereof.

2. Description of the Related Art

A modem has been used for establishing a connection to a network such as Internet. No voice dialog communications may be executed if a line is used for data communications. In addition, the modem is designed to be used for a network-to-network or single node-to-network connection. In other words, most of the connections established are for a fixed station-to-fixed station and/or mobile station-to-fixed station connection. Accordingly, in view of the typical modem's applications, it seems that a mobile station-to-mobile station connection is of little significance.

An instant messaging allows exchanging messages and/or files on a peer-to-peer basis or via a server. Thus, use of the instant messaging enables the voice dialog and the file exchange to be achieved easily. However, the instant messaging is initially intended to exchange messages, and thus provides no measures for exchanging packets between the networks that are engaged in the dialog. In other words, the instant messaging is merely adapted to perform communications between the applications, and has no function of transferring the communications to neighboring computers.

In Japanese Patent Application Laid-Open No. 2000-115253, there is disclosed a technology that enables a mobile phone terminal having an IP phone function to transfer a packet according to a data type to other neighboring computers or to issue a data transfer instruction.

SUMMARY OF THE INVENTION

However, technique disclosed in the above Japanese Patent Application Laid-Open No. 2000-115253 includes no concept of access control and session control. Specifically, even if a transfer of the packet to another computer is executed, the another computer that accepted the packet may not be able to determine whether the accepted packet needs to be processed or discarded. In addition, because of the presence of no session control concept, another computer may not be able to determine how long such processed data should be held.

A typical concept of log used in utilization of a workstation is that once login is permitted, a personal computer (which will be hereinafter referred to as PC) is allowed to access any resources within the limit of its authorized level. In such a case, it would be very difficult for an owner of the resource to intervene.

The present invention has been made in view of the above circumstances. It is desirable to provide an information processing system and/or an information processing method, which are capable of transmitting and receiving a control packet from a remote apparatus that is placed on a network in a location where another party resides, with which voice dialog communications is being taken place. Further it is desirable to provide an information processing system and/or an information processing method with measures to address issues regarding the access control and/or session control.

According to one embodiment of the present invention, there is provided an information processing system including: at least two mobile electronic apparatuses capable of wireless connection to a communications network for performing a voice dialog communication; a communications network being wirelessly connected to the at least two mobile electronic apparatuses and used for the voice dialog communication; and at least two information processing apparatuses connecting to the communications network and performing other data communication through the at least two mobile electronic apparatuses and the communication network, the other data communication being different from the voice dialog communication that is performed by the mobile electronic apparatuses; wherein the voice dialog communication and the other data communication are performed in parallel.

The information processing system according to the one embodiment of the present invention uses a line connected for an IP phone, a mobile phone or the like for both dialog with other party and communication with apparatuses that reside on the other party's network. In the information processing system, a termination of the dialog causes a stop of the network connection. Further, in the information processing system of the present embodiment, it is possible to specify an apparatus that is allowed to participate the packet transfer by using a predetermined specifying methods.

According to one embodiment of the present invention, there is provided an information processing method for an information processing system including: at least two mobile electronic apparatuses capable of wireless connection to a communications network for performing a voice dialog communication; a communications network being wirelessly connected to the at least two mobile electronic apparatuses and used for the voice dialog communication; and at least two information processing apparatuses connecting to the communications network and performing other data communication through the at least two mobile electronic apparatuses and the communication network, the other data communication being different from the voice dialog communication that is performed by the mobile electronic apparatuses, the information processing method including: a step of causing a transmitting-side mobile electronic apparatus and a receiving-side mobile electronic apparatus to perform communication for a voice call; a step of establishing a wireless connection between the transmitting-side mobile electronic apparatus and a transmitting-side information processing apparatus; a step of establishing a wireless connection between the receiving-side mobile electronic apparatus and a receiving-side information processing apparatus; a step of transmitting a right-to-reference data of the transmitting-side information processing apparatus from the transmitting-side mobile electronic apparatus to the receiving-side mobile electronic apparatus, the right-to-reference data being provided to the transmitting-side mobile electronic apparatus in advance; a step of transferring the right-to-reference data from the receiving-side mobile electronic apparatus to the receiving-side information processing apparatus; and a step of transferring data from the transmitting-side information processing apparatus to the receiving-side information processing apparatus through the transmitting-side mobile electronic apparatus and the receiving-side mobile electronic apparatus in response to a data request issued from the receiving-side information processing apparatus.

The information processing method according to the present embodiment uses a line connected for an IP phone for both dialog with other party and communication with apparatuses that reside on the other party's network.

According to one embodiment of the present invention, there is provided an information processing method for an information processing system including: at least two mobile electronic apparatuses capable of wireless connection to a communications network for performing a voice dialog communication; a communications network being wirelessly connected to the at least two mobile electronic apparatuses and used for the voice dialog communication; and at least two information processing apparatuses connecting to the communications network and performing other data communication through the at least two mobile electronic apparatuses and the communication network, the other data communication being different from the voice dialog communication that is performed by the mobile electronic apparatuses, the information processing method including: a step of causing a transmitting-side mobile electronic apparatus and a receiving-side mobile electronic apparatus to perform communication for a voice call; a step of establishing a wireless connection between the transmitting-side mobile electronic apparatus and a transmitting-side information processing apparatus; a step of establishing a wireless connection between the receiving-side mobile electronic apparatus and a receiving-side information processing apparatus; a step of transmitting a right-to-reference data of the transmitting-side information processing apparatus from the transmitting-side mobile electronic apparatus to the receiving-side mobile electronic apparatus, the right-to-reference data being provided to the transmitting-side mobile electronic apparatus in advance; a step of transferring the right-to-reference data from the receiving-side mobile electronic apparatus to the receiving-side information processing apparatus; and a step of performing direct communication between a transmitting-side information processing apparatus and a receiving-side information processing apparatus with each other using a communication connection that is being used for a voice call between the transmitting-side mobile electronic apparatus and the receiving-side mobile electronic apparatus.

The information processing method according to the present embodiment uses a line connected for a mobile phone both for both dialog with other party and communication with apparatuses that reside on the other party's network.

According to the embodiments of the present invention, it is possible to provide an information processing system and/or an information processing method, which are capable of transmitting and receiving a control packet from a remote apparatus that is placed on a network in a location where another party resides, with which voice dialog communications is being taken place. Further, according to the embodiments of the present invention, it is possible to provide an information processing system and/or an information processing method with measures to address issues regarding the access control and/or session control.

According to one embodiment of the present invention, a mobile electronic apparatus is provided. The mobile electronic apparatus includes communication means for establishing a wireless connection to a communication network for a voice dialog communication with another mobile electronic apparatus; and connection means for establishing a wireless connection to a first information processing apparatus. Further, data communication in between the first information processing apparatus and a second information processing apparatus, to which the another mobile electronic apparatus is wirelessly connected, is performed via the another mobile electronic apparatus and the communication network, the data communication being different from the voice dialog communication.

According to one embodiment of the present invention, an information processing apparatus is provided. The information processing apparatus includes connection means for establishing a wireless connection to a first mobile electronic apparatus. Further, data communication with another information processing apparatus, to which a second portable electronic apparatus is wirelessly connected, is performed via the first and second mobile electronic apparatuses and the communication network, the data communication being different from the voice dialog communication that is performed in between the first and the second portable electronic apparatuses.

BRIEF DESCRIPTION OF THE DRAWINGS

The features and advantages of the present invention will become more apparent in the following description of presently preferred embodiments of the invention taken in conjunction with the accompanying drawings, in which:

FIG. 10 is a diagram showing a configuration of another information processing system.

DETAILED DESCRIPTION OF THE EMBODIMENTS

Figure 1:
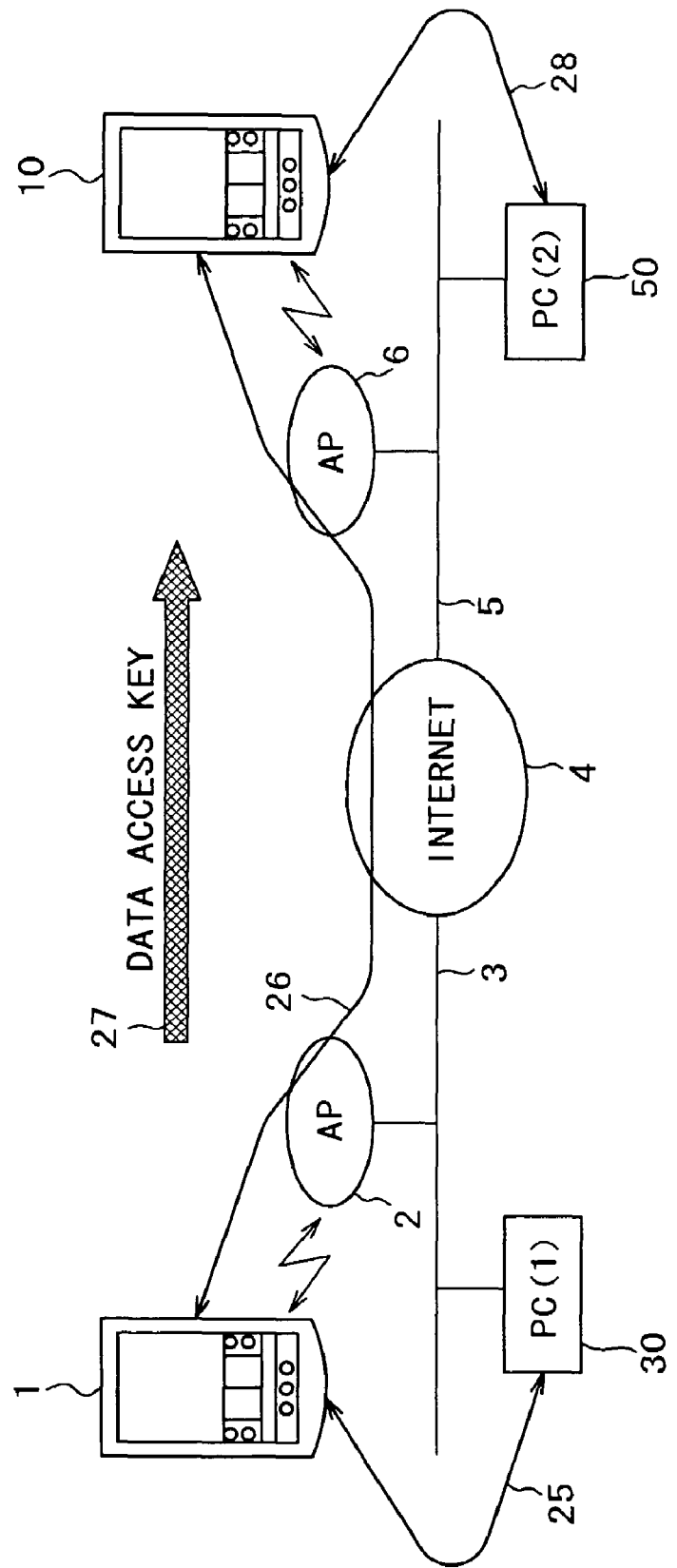
FIG. 1 is a diagram showing a configuration of an information processing system.

Below, an embodiment of the present invention will be described with reference to figures. As shown in FIG. 1, an information processing system according to an embodiment of the present invention includes communications networks 3 to 5, two mobile electronic apparatuses 1 and 10 that respectively establishes wireless connections to the communications networks 3 to 5, and two information processing apparatuses 30 and 50 that are respectively located in the vicinity of the mobile electronic apparatuses 1 and 10 and connected to the communications networks 3 to 5.

The communications networks 3 to 5 include a communication line and an information communications network. As specific examples of the communications network of the present embodiment of the present invention, general public lines 3-5 and the Internet 4, which is a worldwide prevailing network environment attained by interconnection of a plurality of information communications networks, are used. At present, the Internet 4 enables broadband transmission because of the wide spread of broadband high-speed communication lines. The Internet may be realized by utilizing optical fibers, cable televisions (CATV), radio communications or the like. Typically, a communication line of 500 kbps or more communication line is used to constitute such a network. Alternatively, a Local Area Network (LAN) may also be used to constitute the network.

Figure 2:
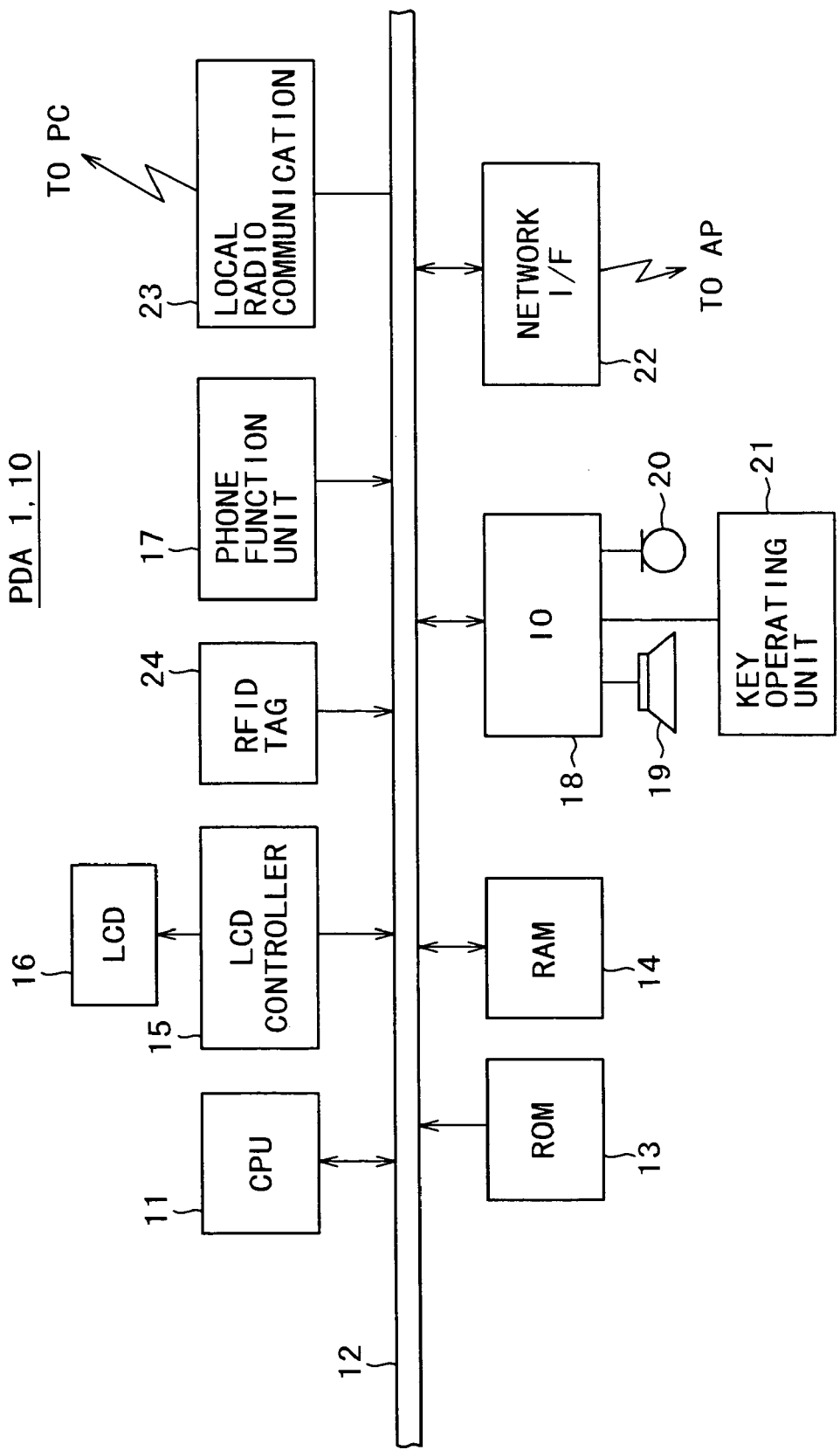
FIG. 2 is a block diagram showing a Personal Digital Assistant (which will be hereinafter referred to as PDA)

As shown in FIG. 2, each of the two mobile electronic apparatuses 1 and 10 may be a Personal Digital Assistant (PDA), for instance. Each of the PDA 1 and the PDA 10 has a ROM 13, a RAM 14 and a LCD controller 15, which are all connected to a CPU 11 through a BUS 12. Further, a phone function unit 17, an input/output (which will be hereinafter referred to as IO) unit 18, a network interface (which will be hereinafter referred to as network I/F) 22, a local radio communication unit 23 and a Radio Frequency Identification tag (which will be hereinafter referred to as RFID tag) 24 are connected to the CPU 11 through the BUS 12.

A LCD 16 is connected to the LCD controller 15. In addition, a speaker 19 and a microphone 20 that will be used at the time of a conversation or the like, and a key operating unit 21 that will be used at the time of a dialing operation are connected to the IO unit 18.

Each of the PDAs 1 and 10 has, for instance, in the ROM 13, application software that performs a typical Personal Information Management (which will be hereinafter referred to as PIM) function, which may include functions such as an electronic schedule management, an electronic address book, an electronic memo note and an action list management. Each of the PDAs 1 and 10 achieves each of the above functions by executing the application software with the CPU 11. In addition, each of the PDAs 1 and 10 has an Internet connection function that uses the network I/F 22.

The phone function unit 17 has phone signal processing units such as a RF processing unit, a modulation/demodulation unit and a voice processing unit. The phone function unit 17 calls out another party (in this embodiment, the PDA 10 is assigned for another party of the PDA 1) specified by another party's call number inputted through the key operating unit 21 connected to the IO unit 18. If a line connection is established, the phone function unit 17 performs each process with the phone signal processing units. As a result, a user carries out voice communication over the Internet using the speaker 19 and the microphone 20. In this case, the network I/F 22 is connected by radio to an access point (which will be hereinafter referred to as AP) to perform the communication over the Internet according to a protocol of an Internet phone such as a Voice over IP (which will be hereinafter referred to as VoIP). The VoIP is a technology for separating a digitally coded voice signal into packets with a certain period of time interval to perform transmission and reception of the voice signal in form of an IP datagram.

The local radio communication unit 23 has therein a predetermined band processing unit, a RF processing unit and a local radio communication antenna to perform radio communication of data with a personal computer (PC).

The RFID tag 24 allows the PC to read a RFID by bringing it into contact with or close to a radio reading device installed in the PC. The RFID tag 24 includes a semiconductor chip such as a silicon chip and an antenna that is capable of performing data transmission. The PC enables radio communication of data with the PDA using the local radio communication unit 23 in accordance with an authentication result obtained after verification of the RFID.

Use of the Internet connection function and the phone function unit 17 allows each of the PDAs 1 and 10 to operate as an Internet phone realized over the Internet. In other words, each of the PDAs 1 and 10 uses the Internet connection function and the phone function unit 17 to attain communication for a voice dialog over the Internet according to a protocol of the Internet phone such as the VoIP. Specifically, the PDAs 1 and 10 are connected by radio to connection points 2 and 6 called access points (APs) to perform the communication for the voice dialog, in other words, a voice call over the VoIP network, as shown in FIG. 1.

In addition, the PDAs 1 and 10 perform the radio communication of data with the PCs 30 and 50 using the local radio communication unit 23 after the connection with the PCs is established using the RFID, as described above.

Figure 3:
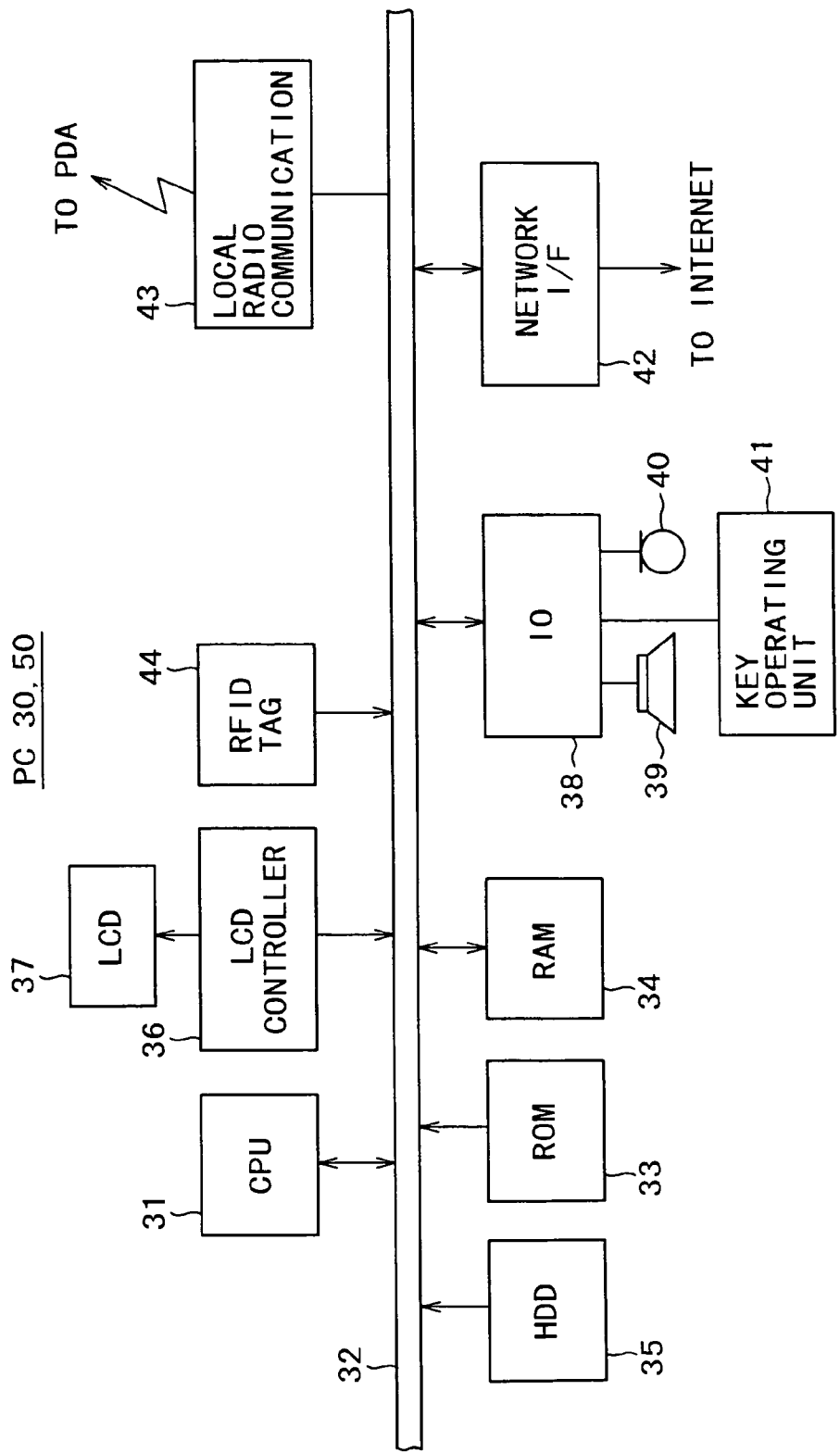
FIG. 3 is a block diagram showing a PC.

As shown in FIG. 3, each of the PCs 30 and 50, which are specific examples of the information processing apparatuses, has a ROM 33, a RAM 34, a HDD 35 and a LCD controller 36, which are all connected to a CPU 31 through a BUS 32. In addition, there are also shown an input/output (which will be hereinafter referred to as IO) unit 38, a network interface (which will be hereinafter referred to as network I/F) 42, a local radio communication unit 43 and a RFID read unit 44, which are all connected to the CPU 31 through the BUS 32.

A LCD 37 is connected to the LCD controller 36. A speaker 39, a microphone 40 and a key operating unit 41 are connected to the IO unit 38.

Each of the PCs 30 and 50 has, for instance in the HDD 35 and the ROM 33, various kinds of application software such as presentation software that handles video data, voice data or text data, in addition to each application software that performs a general PIM function, specifically, functions such as an electronic schedule management, an electronic address book, an electronic memo note and an action list management. Each of the PCs 30 and 50 achieves the above functions by utilizing the CPU for taking out each application and executing it while using the RAM 34 as a work area. In addition, each of the PCs 30 and 50 also has an Internet connection function that is performed using the network I/F 42.

The local radio communication unit 43 has therein a predetermined band processing unit, a RF processing unit and a local radio communication antenna to perform radio communication of data with the PDA.

The RFID read unit 44 reads the RFID from the RFID tag 24 in the proximity of the PDA to authenticate an ID of the PDA. It should be noted that a connection process performed using the RFID is described later. The local radio communication unit 43 performs data communication with the PDA on the basis of an authentication result of the ID of the PDA.

The PCs 30 and 50 perform data communication by taking advantage of the VoIP that is capable of transmitting an arbitrary character string of H.323 or the like that controls the PDAs 1 and 10 to achieve the Internet phone function.

Figure 4:
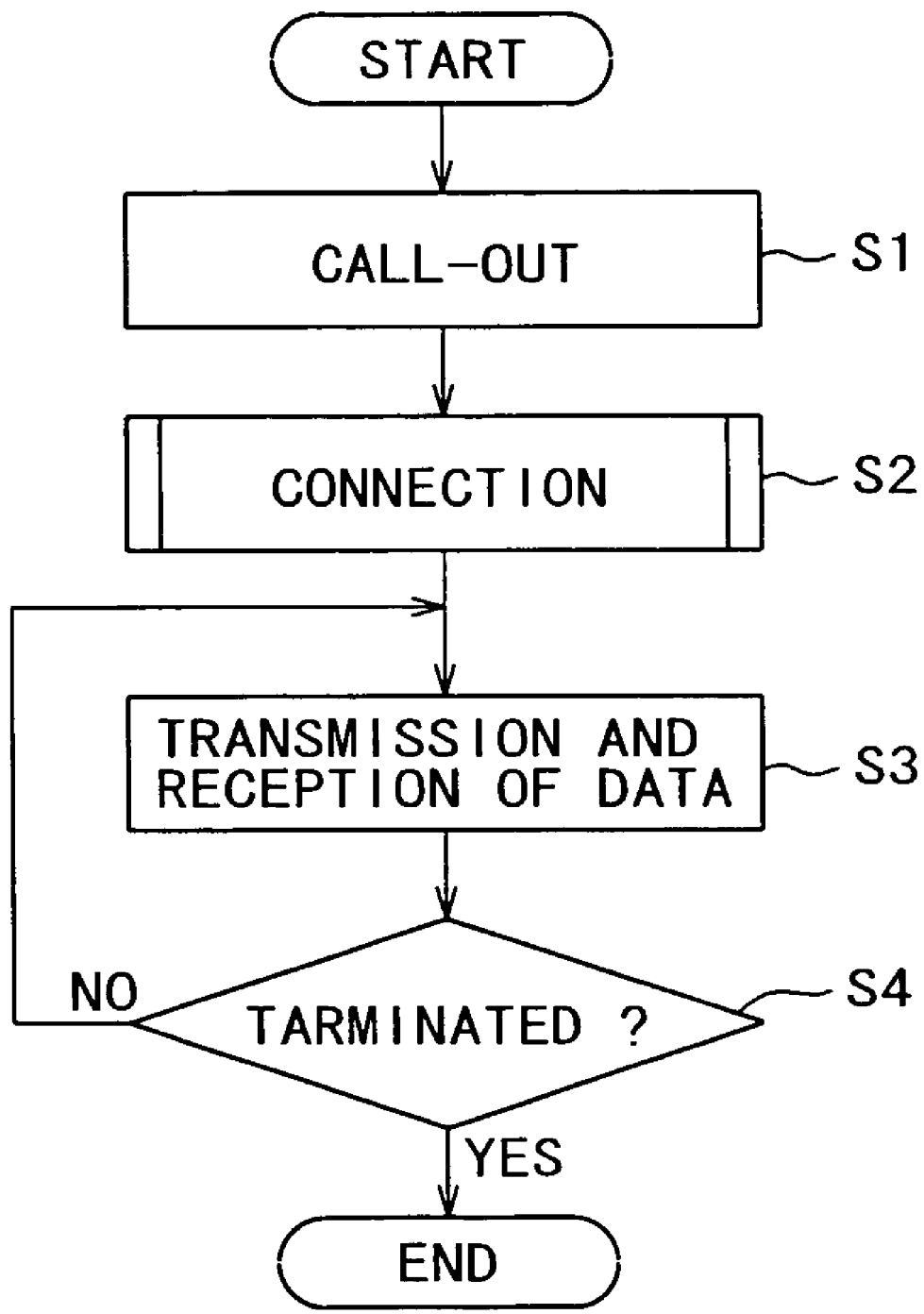
FIG. 4 is a flowchart showing a procedure of process in a PDA.

An outline of an operation of the information processing system is described with reference to flowcharts of FIGS. 4 and 5 below. FIG. 4 is a flowchart showing a procedure of a process if the PDA 1 is used to make an IP phone call to establish a line connection. First, the PDA 1 carries out a call-out operation on the basis of a call number or the like inputted through the key operating unit 21 (Step S1). Another party's address specified in the call-out operation includes an address such as an IP address and a character string registered in a H.323 gatekeeper. If the call-out operation is successfully completed and a called party permits the connection with the PDA 1 (Step S2), a dialog session starts. In this mode of operation, transmission and reception of voice or image packets may be executable at any arbitrary timing (Step S3), and the respective terminal (PDA) sides becomes available for network-to-network connections. If the call is disconnected by either of the PDA 1 or 10 (YES in Step S4), the network-to-network connection is disconnected at the same time.

Figure 5:
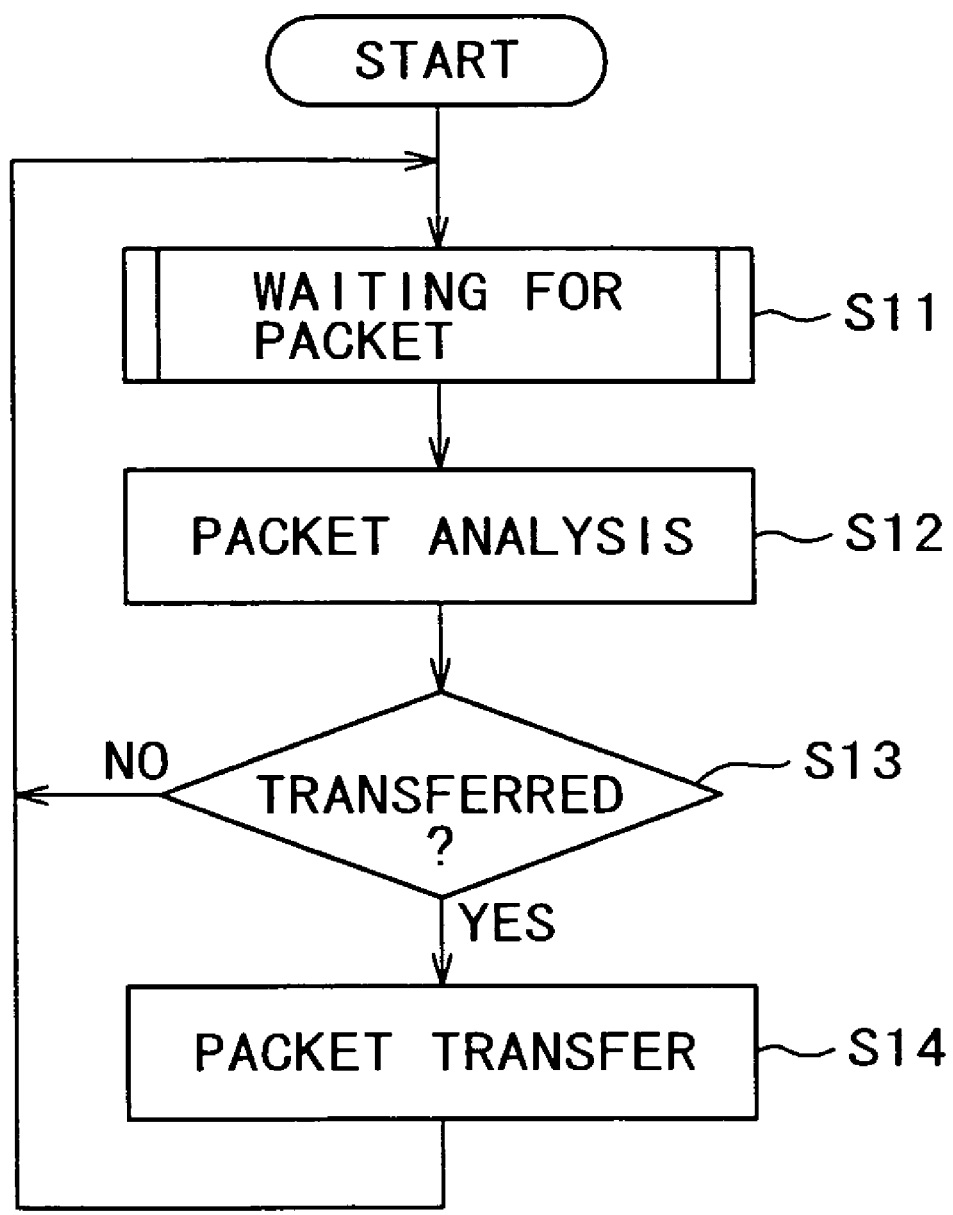
FIG. 5 is a flowchart showing a procedure of process in a PDA.

FIG. 5 is a flowchart showing a procedure in a network connection process if the PDA is in a transmission/reception mode. If the call is established in the process shown in FIG. 4, the flowchart of FIG. 5 is started. If the call is terminated, the process in the flowchart of FIG. 5 is forced to end. The PDA waits for a packet reception at a connected network side (Step S11). Upon reception of the packet, the PDA analyzes a header of the accepted packet (Step S12), and then judges whether or not the accepted packet is a packet to be transferred to a destination of connection (Step S13). If the accepted packet is judged as the packet to be transferred (YES), the PDA transfers the packet through an arbitrary character string transmission process according to H.323 after replacement of the header (Step S14). Alternatively, if an arbitrary character string transmitted according to H.323 is accepted, the PDA may perform packet transmission to the network side after replacement of a header of the accepted character string.

In the above packet transfer process, the PDA may perform the transfer of all the packets directing toward the network side, or may perform the transfer of the packet only between the PDA and a specific machine (PC).

Utilization of the above described process is effective in configuring a context aware system of a remote condition such as a case where a user having the PDA, for instance, wishes to cause a machine, which is disposed on a network to which the other party (PDA) is connected, to display the user's own contents.

Figure 6:
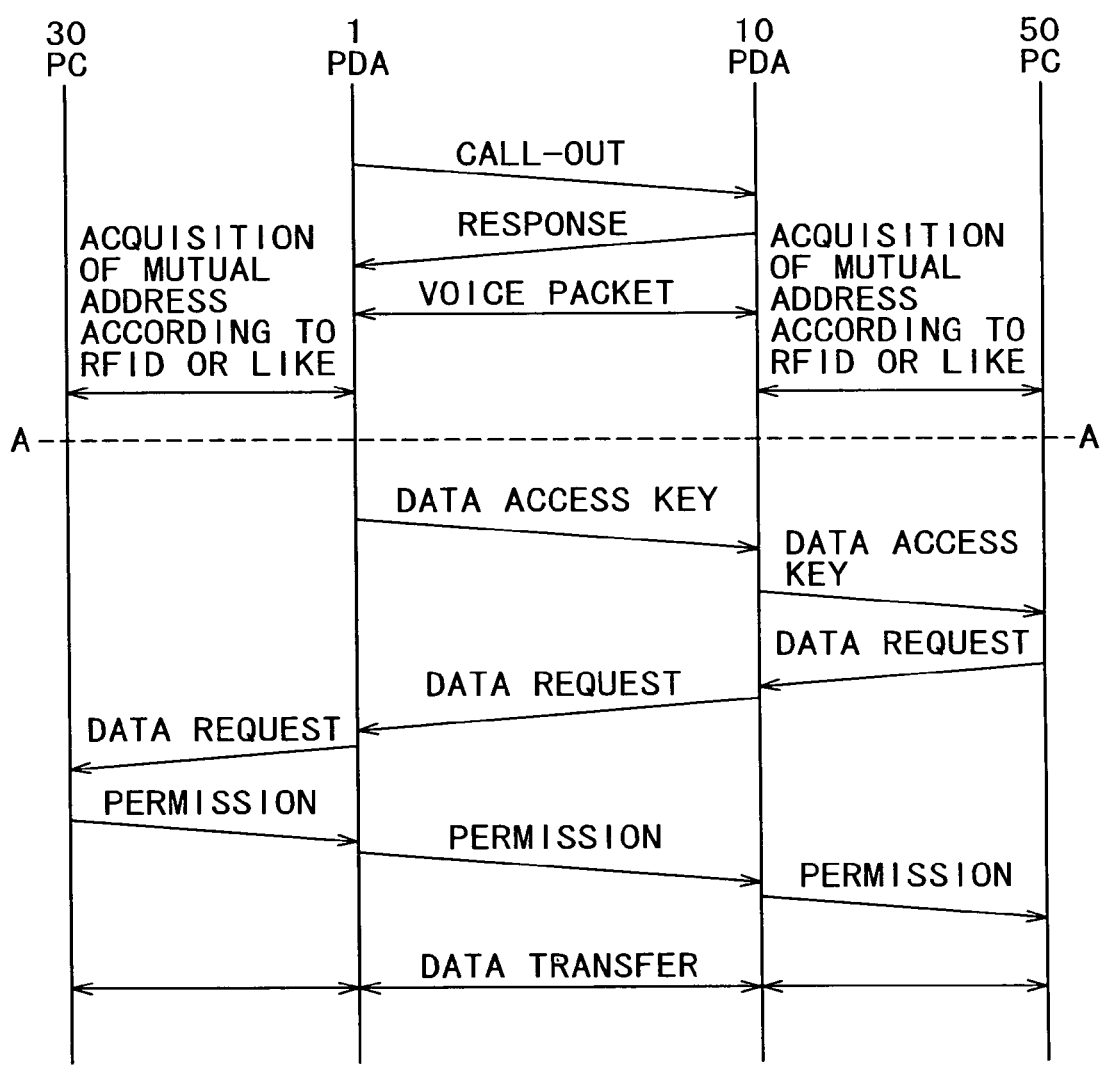
FIG. 6 is a diagram showing a sequence of an information processing system.

FIG. 6 is a diagram showing a sequence of process steps from a PDA-to-PDA connection to a PC-to-PC data transfer via the PDAs. First, if the PDA 1 sends a call and the PDA 10 responds to that call, the PDAs land 10 perform transmission and reception of voice packets over the IP network for voice communication.

Next, the PDA 1 and the PC 30 are interconnected after acquisition of mutual addresses in accordance with the RFID or the like through the RFID tag 24 and the RFID read unit 44. Similarly, the PDA 10 and the PC 50 are also interconnected after acquisition of mutual addresses in accordance with the RFID or the like. The interconnections between the PC 30 and the PDA 1 and between the PC 50 and the PDA 10 may be permitted at any point of time above a timing shown by a broken line A in FIG. 6. It should be noted that the PDA 1 has an access key (right of reference) to data within the PC 30 in advance.

Next, the PDA 1 transfers the access key (right of reference) to data within the PC 30 to the PDA 10. Actual data remains in the PC 30 or the PDA 1, and only the access key, which is the right of reference to the data, is transferred to the other party's PDA 10. The access key is transferred from the PDA 10 to the PC 50.

Next, if the PC 50 issues a data request, the data request is transmitted to the PC 30 through the PDA 10 and the PDA 1. With the data access key and the data request, the address and an authentication key are exchanged between the PC 30 and the PC 50.

Next, if the PC 30 grants permission to the data request, the permission is transmitted to the PC 50 through the PDA 1 and the PDA 10. In this stage, the data within the PC 30 is transferred between the PC 30 and the PDA 1, between the PDA 1 and the PDA 10 and between the PDA 10 and the PC 50 by means of packet exchanging using an arbitrary character string transfer function of H.323 protocol. Thus, the PC 30 and the PC 50 are allowed to perform data communication using the connection between the PDA 1 and the PDA 10. Accordingly, the communication between the PC 30 and the PC 50 becomes possible during a period in which the connection between the PDA 1 and the PDA 10 is available. In addition, the data in the PC 30 may be viewed not only on a display unit of the PC 50 but also on a display unit of the PDA 1 and that of the PDA 10.

The example of communication processing described above relates to the process from the PDA-to-PDA connection to the PC-to-PC data transfer via the PDAs, or, the process that provides the PC-to-PC communication with using the PDA-to-PDA connection.

Figure 7:
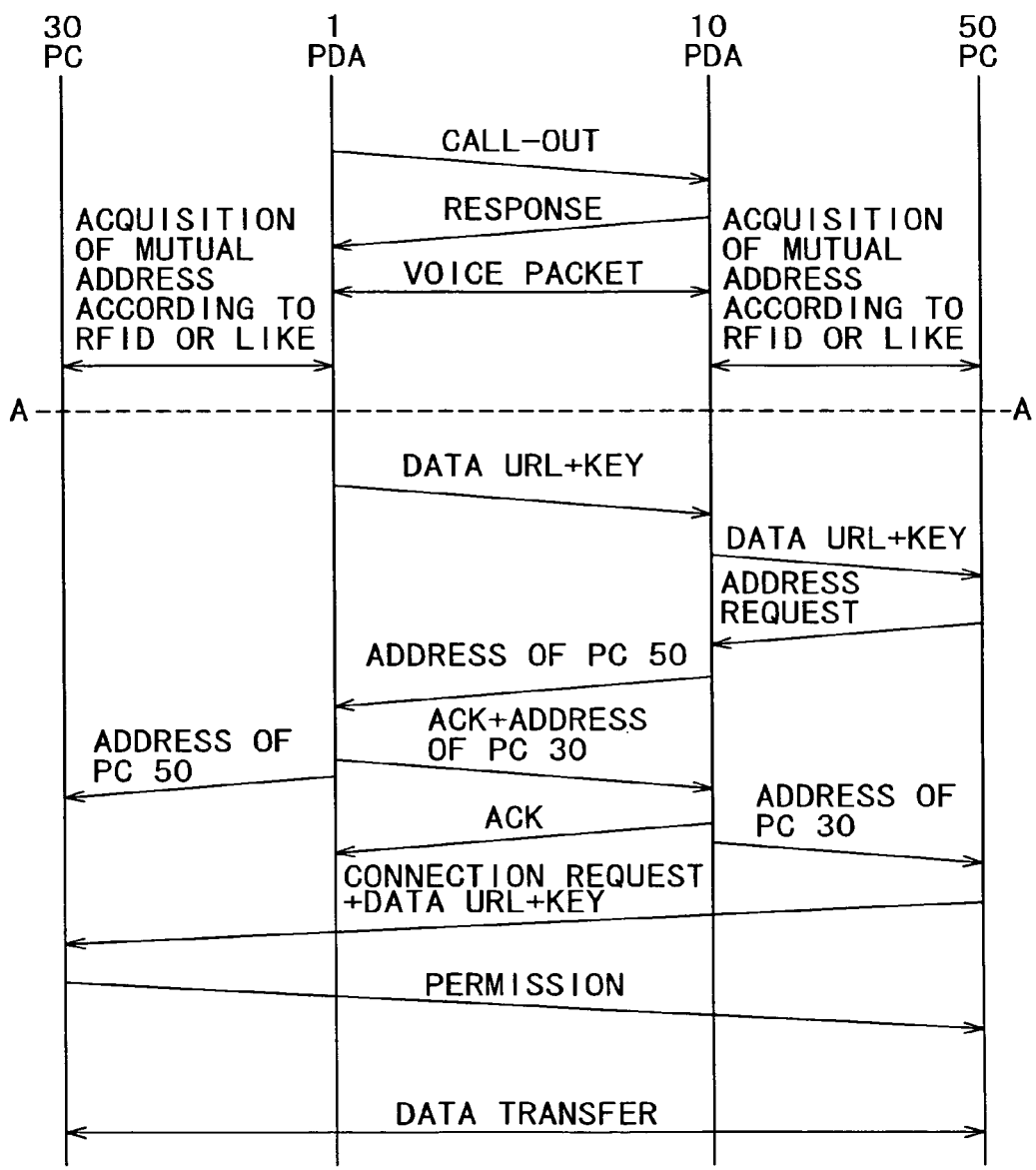
FIG. 7 is a diagram showing another sequence of an information processing system.

Alternatively, in another example, the system having the configuration shown in FIG. 1 may also realize a process from the PDA-to-PDA connection to the PC-to-PC data transfer, or, a process that provides the PC-to-PC communication directly with using both the acquired addresses in the PCs and the authentication key. FIG. 7 shows a sequence of a process from the PDA-to-PDA connection to the PC-to-PC data transfer. First, if the PDA 1 sends a call and the PDA 10 responds to that call, the PDAs 1 and 10 perform transmission and reception of voice packets over the IP network for voice communication.

Next, the PDA 1 and the PC 30 are interconnected after acquisition of mutual addresses in accordance with the RFID or the like. Similarly, the PDA 10 and the PC 50 are also interconnected after acquisition of mutual addresses in accordance with the RFID or the like. The interconnections between the PC 30 and the PDA 1 and between the PC 50 and the PDA 10 may be established at any point of time above a timing shown by a broken line A in FIG. 7. It should be noted that the PDA 1 has an access key (right of reference) to the data within the PC 30 in advance. As the access key in this case, the PDA 1 has a key and a URL of the Internet, to which the PC 30, as a server, provides data.

Next, the PDA 1 transfers the key and the URL of the Internet to the PDA 10. Further, the key and the URL of the Internet are transferred from the PDA 10 to the PC 50. If the PC 50 issues an address request, the PDA 10 transmits an address of the PC 50 to the PDA 1. The PDA 1 returns an affirmative acknowledgement (which will be hereinafter referred to as ACK) to the PDA 10, together with an address of the PC 30. Further, the PDA 1 transmits the address of the PC 50 to the PC 30.

Next, the PDA 10 returns the ACK to the PDA 1, and also transmits the address of the PC 30 to the PC 50. Accordingly, the PC 50 issues a connection request directly to the PC 30, together with data URL and the key. If the PC 30 grants permission to the connection request from the PC 50, the PCs 30 and 50 may perform direct communication of data with each other.

In the above processes shown in FIGS. 6 and 7, the establishment of the PDA-to-PC connection is achieved by the acquisition of the mutual addresses using the RFID. There are two methods for establishing the PDA-to-PC connection using the RFID. One of such methods uses an address manager and the other uses no address manager. These methods will be described below.

Figure 8:
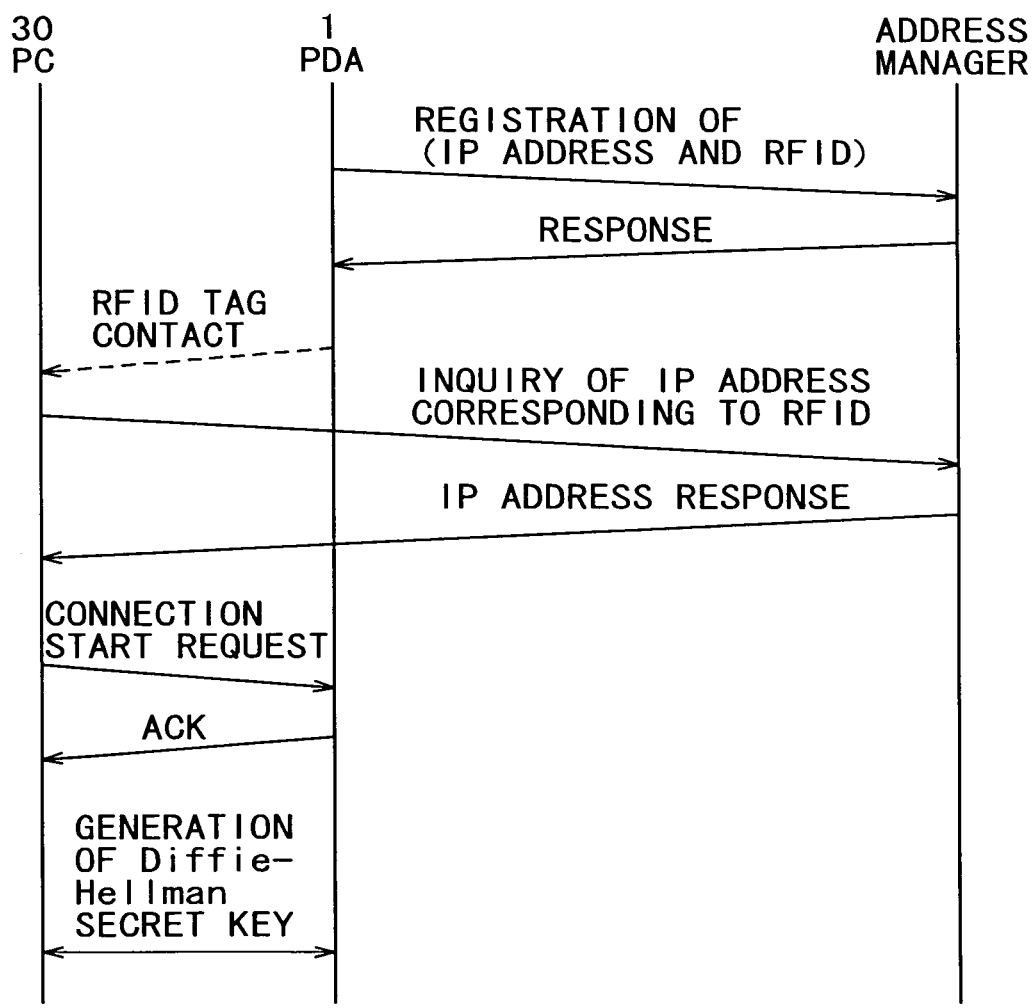
FIG. 8 is a diagram showing a sequence of a connection start procedure (in the presence of an address manager) using a Radio Frequency Identification (which will be hereinafter referred to as RFID)

First, a start of the connection with the RFID in the presence of the address manager is described with reference to FIG. 8. While the following description is given by taking a case of a connection between the PC 30 and the PDA 1, the same may be also applied to a connection between the PC 50 and the PDA 10.

Registrations of an IP address of the PDA 1 and the RFID into the address manager are executed at a starting time and also at a certain period of time interval. An address of the address manager needs to be provided to the PDA 1 and the PC 30 in advance. Upon completion of the registration, a response is returned from the address manager to the PDA 1.

Thereafter, the RFID tag is transferred to the PC 30 by bringing the PDA 1 into contact with or close to a predetermined location of the PC 30. The PC 30 inquires the address manager about an IP address corresponding to the RFID of the PDA 1. The address manager returns the IP address of the PDA 1 to the PC 30.

Upon reception of the IP address, the PC 30 issues a connection start request to the PDA 1. The PDA 1 returns the ACK to the PC 30. Next, the PC 30 and the PDA 1 generate a secret key (Diffie-Hellman key, for instance) to perform radio communication of the data while encrypting and/or decrypting data using the secret key.

Figure 9:
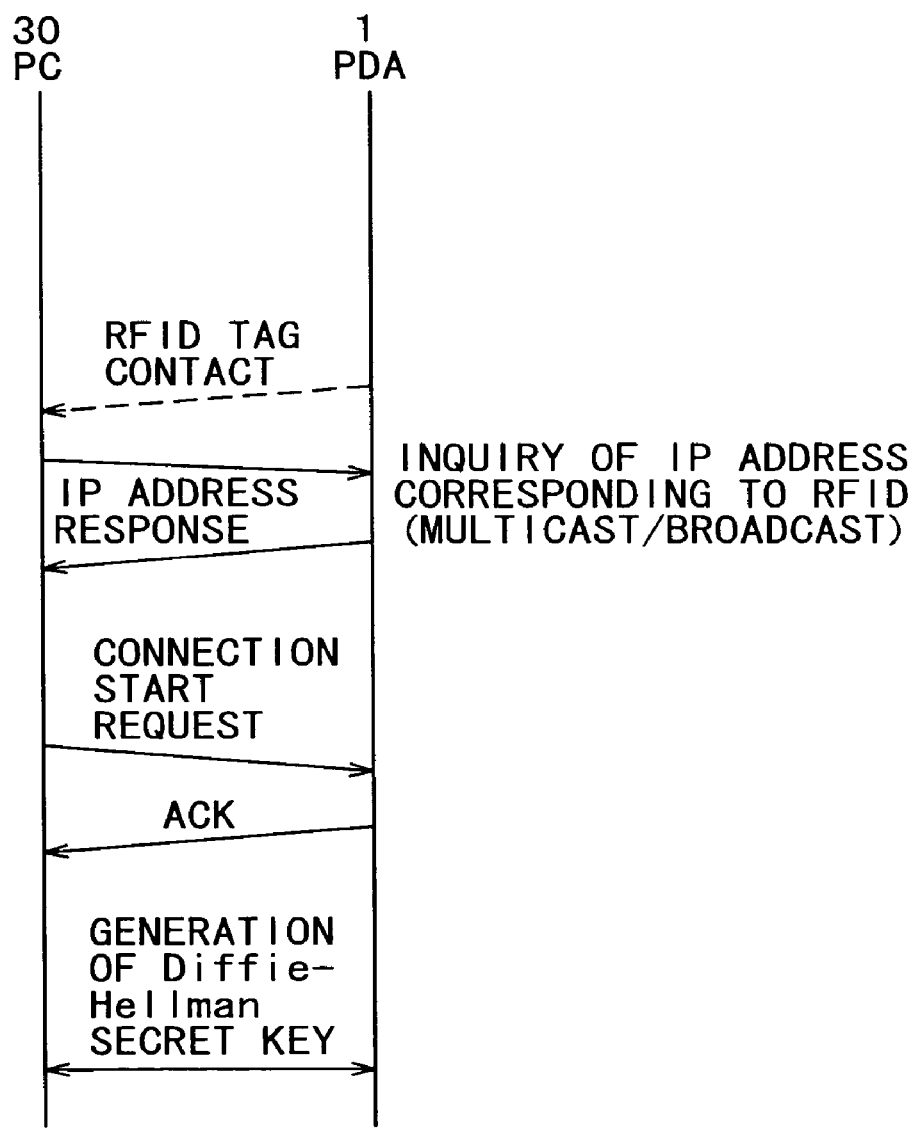
FIG. 9 is a diagram showing a sequence of a connection start procedure (in the presence of no address manager) using an RFID.

Next, a start of the connection with the RFID in the presence of no address manager is described with reference to FIG. 9. While the following description is given by taking a case of a connection between the PC 30 and the PDA 1, the same may be also applied to a connection between the PC 50 and the PDA 10.

First, the RFID tag is transferred to the PC 30 by bringing the PDA 1 into contact with or close to the predetermined location of the PC 30. The PC 30 inquires the PDA 1 about an IP address corresponding to the RFID in a multicast/broadcast manner. The PDA 1 returns the IP address to the PC 30.

Upon reception of the IP address, the PC 30 issues a connection start request to the PDA 1. The PDA 1 returns the ACK to the PC 30. Next, the PC 30 and the PDA 1 generate a secret key (Diffie-Hellman key, for instance) to perform radio communication of data while encrypting and/or decrypting data using the secret key.

According to the above connection method, while no address manager is required, an allowable response range of the PDA is limited to a region where the packets are reachable.

While the information processing systems of the above embodiments are ones utilizing the IP phone, the present invention is also applicable to an information processing system having a configuration that uses no IP phone. FIG. 10 is a diagram showing a configuration of an information processing system 60 that allows functions as those of the information processing system shown in FIG. 1 to be implemented without using the IP phone. The information processing system 60 uses a mobile phone 61 such as a Personal Digital Cellular (PDC) or a Personal Handy-phone System (PHS) as each of the two mobile electronic apparatuses. The mobile phone 61 is connected to a modem 62 as will be described later. A PC 63 may be a small-sized built-in type. A network interface 64 is to interface to a LAN, specifically, an Ethernet (which is a registered trademark) and performs communication with other computers through wire or by radio. The above described constituting elements of the information processing system 60 may be connected together by connectors or the like or may be integrated as a single unit.

The information processing system 60 performs transmission and reception by encoding or decoding a data packet with the modem 62 using a Dial Tone Multi Frequency (which will be hereinafter referred to as DTMF). A method of encoding is not limited to the DTMF, and any other encoding method that permits transmission and reception between the mobile phones may be employed.

The modem 62 may be installed on a wall or a side of a or the like location where it is easy for a user to bring the mobile phone 61 close to the modem. If the user wishes to perform the transfer of packet for a file transfer or the like, the user may bring his/her mobile phone 61 into contact with or close to the modem 62, thereby enabling to establish the network-to-network connection.

Accordingly, the packets are transferred only in a period in which users of transmitting-side and receiving-side voluntarily keep bringing their mobile phones 61 into contact with or close to the modem 62.

Advantages of the information processing system 10 having the configuration shown in FIG. 1 and the information processing system 60 having the configuration shown in FIG. 10 are summarized below. Each of the systems may allow transmission and reception of control packets between a remote apparatus and an apparatus that resides on a network in which the other party of a mobile electronic apparatus exists. In addition, each of the systems allows a user who has a mobile electronic apparatus to restrictively specify a remotely connectable apparatus. Further, a termination of call causes the networks to be disconnected. Accordingly, timing of network disconnection may be specified intuitively, and it makes possible to ensure that both of a calling user and a called user may control the network disconnection or the timing of network disconnection.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing method for an information processing system including: at least two mobile electronic apparatuses capable of wireless connection to a communications network for performing a voice dialog communication; a communications network being wirelessly connected to the at least two mobile electronic apparatuses and used for the voice dialog communication; and at least two information processing apparatuses connecting to the communications network and performing other data communication through the at least two mobile electronic apparatuses and the communication network, the other data communication being different from the voice dialog communication that is performed by the mobile electronic apparatuses, the information processing method comprising:

a step of causing a transmitting-side mobile electronic apparatus and a receiving-side mobile electronic apparatus to perform communication for a voice call;

a step of establishing a wireless connection between the transmitting-side mobile electronic apparatus and a transmitting-side information processing apparatus;

a step of establishing a wireless connection between the receiving-side mobile electronic apparatus and a receiving-side information processing apparatus;

a step of transmitting a right-to-reference data of the transmitting-side information processing apparatus from the transmitting-side mobile electronic apparatus to the receiving-side mobile electronic apparatus, the right-to-reference data being provided to the transmitting-side mobile electronic apparatus in advance;

a step of transferring the right-to-reference data from the receiving-side mobile electronic apparatus to the receiving-side information processing apparatus; and a step of transferring data from the transmitting-side information processing apparatus to the receiving-side information processing apparatus through the transmitting-side mobile electronic apparatus and the receiving-side mobile electronic apparatus in response to a data request issued from the receiving-side information processing apparatus.

2. The information processing method according to claim 1, wherein, in the step of transferring data from the transmitting-side information processing apparatus to the receiving-side information processing apparatus through the transmitting-side mobile electronic apparatus and the receiving-side mobile electronic apparatus in response to a data request issued from the receiving-side information processing apparatus, an arbitrary character string transfer function of H.323 protocol is used.

3. The information processing method according to claim 1, wherein the step of transferring data from the transmitting-side information processing apparatus to the receiving-side information processing apparatus through the transmitting-side mobile electronic apparatus and the receiving-side mobile electronic apparatus in response to a data request issued from the receiving-side information processing apparatus is available only in a period in which the communication for a voice call between the two mobile electronic apparatuses is in progress.

4. An information processing method for an information processing system including: at least two mobile electronic apparatuses capable of wireless connection to a communications network for performing a voice dialog communication; a communications network being wirelessly connected to the at least two mobile electronic apparatuses and used for the voice dialog communication; and at least two information processing apparatuses connecting to the communications network and performing other data communication through the at least two mobile electronic apparatuses and the communication network, the other data communication being different from the voice dialog communication that is performed by the mobile electronic apparatuses, the information processing method comprising:

a step of causing a transmitting-side mobile electronic apparatus and a receiving-side mobile electronic apparatus to perform communication for a voice call;

a step of establishing a wireless connection between the transmitting-side mobile electronic apparatus and a transmitting-side information processing apparatus;

a step of establishing a wireless connection between the receiving-side mobile electronic apparatus and a receiving-side information processing apparatus;

a step of transmitting a right-to-reference data of the transmitting-side information processing apparatus from the transmitting-side mobile electronic apparatus to the receiving-side mobile electronic apparatus, the right-to-reference data being provided to the transmitting-side mobile electronic apparatus in advance;

a step of transferring the right-to-reference data from the receiving-side mobile electronic apparatus to the receiving-side information processing apparatus; and a step of performing direct communication between a transmitting-side information processing apparatus and a receiving-side information processing apparatus with each other using a communication connection that is being used for a voice call between the transmitting-side mobile electronic apparatus and the receiving-side mobile electronic apparatus.

* * * * *